May 5, 1964
N. R. BECK
3,132,029
METHOD OF PROVIDING A COOKED MEAT AND SAUCE PACKAGE
Filed June 2, 1961
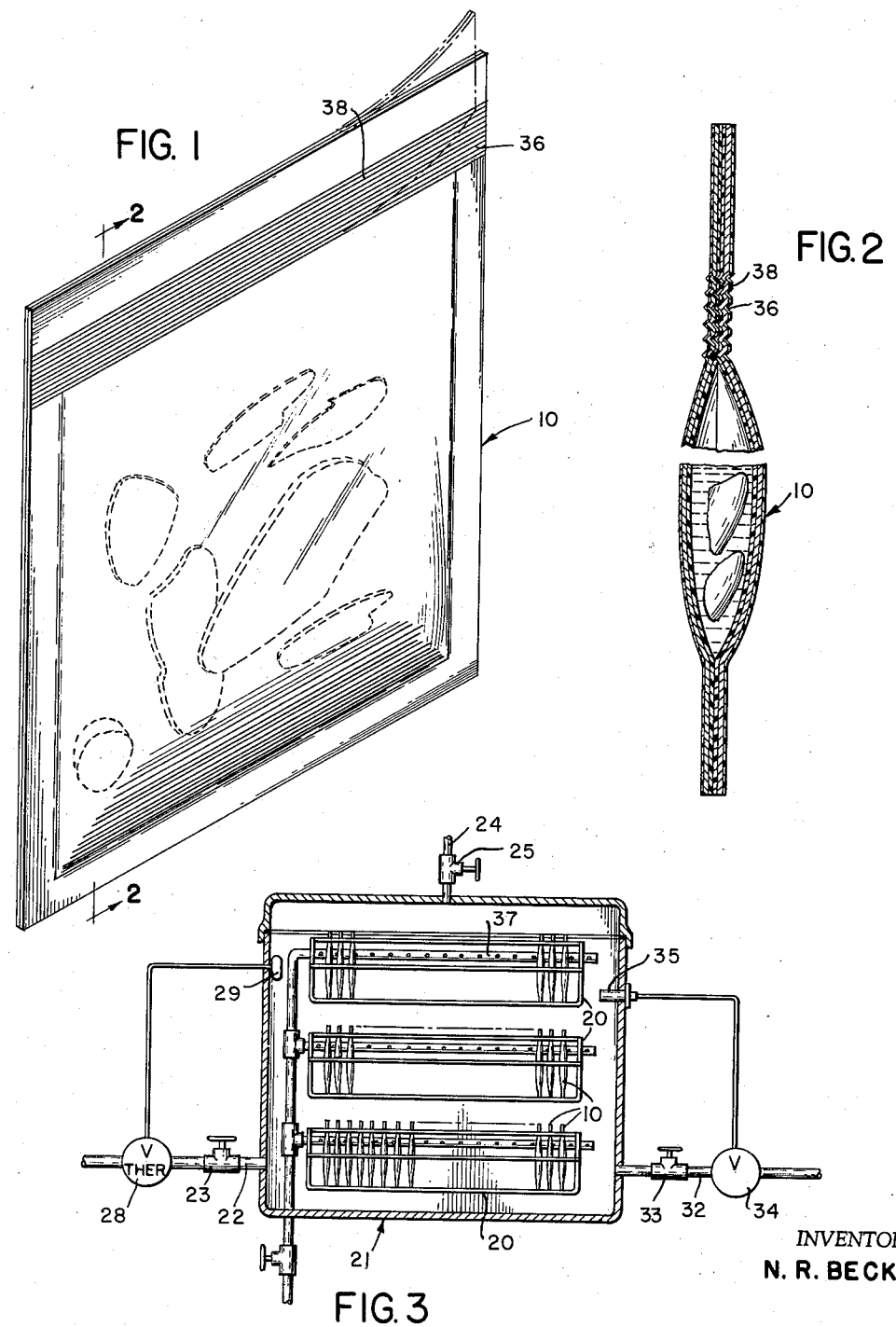
INVENTOR
N. R. BECK
BY
ATTORNEY

United States Patent Office 3,132,029
Patented May 5, 1964

3,132,029
METHOD OF PROVIDING A COOKED MEAT AND SAUCE PACKAGE
Nicholas Robert Beck, 1919 W. Main St., Russellville, Ark.
Filed June 2, 1961, Ser. No. 114,455
1 Claim. (Cl. 99—174)

This invention relates generally to packaging and more particularly to a food package and the method of preparing the same.

The packaging of various commodities and particularly food for handling, transportation, sale and storage for subsequent use has been practiced since earliest days. Ancient methods of preserving foods for lengthy periods include smoking, drying and the application of condiments. However, these procedures affect the palatability by altering the flavor or texture and the product may require substantial additional processing before it is consumed.

In relatively recent times, various commodities have been packaged in cans after having been cooked, and these have been safe to store for substantial periods of time. Packaging in cans is relatively costly and requires the use of containers of substantial weight and of fixed shape and size and which are difficult to open without the use of a special tool. Furthermore, the cans are relatively hard and inflexible and may present problems in packing, transporting and disposal after use.

Still more recently both raw and cooked commodities have been packaged in containers which are refrigerated. Refrigerated commodities have met widespread acceptance but require refrigeration until just before consumption.

Various attempts have been made to produce a flexible package for a commodity such as foods. However, except for dried or relatively dry foodstuffs, flexibly packaged foods available heretofore have not been successful for various reasons including excessive production costs or because the quality of the product has been below that which is acceptable.

Accordingly, it is an object of the present invention to provide a flexible package of a commodity such as a food product including a liquid portion which will keep indefinitely at ordinary temperatures and is in a complete form ready for consumption.

A further object of the present invention is to provide a flexible relatively flat package of precooked meat and sauce which will keep indefinitely without refrigeration and which is ready for consumption upon opening of the package.

A further object is to provide a method for preparing a packaged food commodity such as meat and sauce, and which is relatively simple and inexpensive, and in which the true flavor and texture of the product is retained indefinitely at ordinary temperatures.

These and other objects of the invention will become apparent from the following description in conjunction with the accompanying drawings in which:

FIG. 1 is a perspective of a package in accordance with the present invention;

FIG. 2, a section, with the container's material magnified out of proportion, of a fragmentary section on the line 2—2 of FIG. 1; and FIG. 3, a diagrammatic representation of cooking apparatus illustrative of that which may be employed in practicing the invention.

Briefly stated, the present invention includes a relatively flat package of flexible material which provides protection against rays and the entrance of bacteria and moisture, and which is air and watertight, and contains a mixture such as pieces of meat in a suitable sauce or gravy, although the invention may be useful in the packaging of other commodities. The preferred procedure includes providing a measured quantity of meat portions or slices from which all bone and substantially all the fat has been removed and placing it together with a measured quantity of relatively thick sauce at a temperature in excess of 80° F. within the container, flattening the air space within the container to remove most of the air, sealing the container, retorting the package promptly after sealing at an appropriate cooking and sterilizing temperature for an appropriate time and with the application of sufficient pressure to prevent the internal pressure from damaging the container, and cooling the package while maintaining such pressure.

In one specific application of the invention, packages of turkey and giblet gravy have been produced. In producing these containers 10 of a size suitable for individual servings an appropriate size has been found to be 6 inches by 7 inches. Although these packages may be produced from various substances, a lamination of aluminum foil with other strengthening and sealing materials such as polyethylene and cellophane have been found satisfactory. The polyethylene is desirably on the inner surface of the foil and may be heat sealed to itself. The cellophane on the outside provides added resistance to moisture and bacteria. The foil protects the products against various rays which might affect its quality. The polyethylene or other material must be one which does not react appreciably with the commodity and which is preferably self-sealing on the application of heat and pressure, although suitable adhesives may be used with materials which are not self-sealing. Such packaging material is commercially available and the selection of an appropriate material depends on the product being packaged and other facts well known in the art.

Another laminate which may be used with the foil instead of cellophane is "Mylar," which is made by the condensation of ethylene glycol with terephthalic acid.

The combined thickness of the laminated or coated packaging material may be about 5 mils and still provide adequate strength and protection. Thicker materials may be used for additional strength where rugged conditions are anticipated.

Prior to filling the package blanks are formed by sealing at the margins at the bottom and sides, leaving the top open.

Although various size packages such as that described may be filled with varying amounts of materials, it is contemplated that the same will be relatively flat when filled. Such flatness not only promotes heat transfer but also provides a package which occupies little volume and which may be preferred for certain uses such as in individual rations for the Armed Forces, in vending machines and for individual servings.

Accordingly, in the package illustrated, a total of approximately 5 ounces of commodity may be placed. The commodity, in one example, has consisted of approximately 2½ ounces of raw, fat trimmed, deboned meat, such as turkey. It is desirable that the fat be substantially completely removed or at most not to exceed 10% of the combined weight of itself and the meat since the fat tends to attack certain of the packaging materials. The meat is placed in the package while the meat is at room temperature either before or after or simultaneously with the insertion of a similar quantity of sauce. The sauce or gravy is thicker than that ordinarily prepared since the juices from the meat during cooking will be added, thus thinning it. Such sauce commonly consists of a mixture of broth, flour, starch, salt and spices. These are blended and partially cooked before insertion into the package in order to provide a relatively smooth mixture of the ingredients and to drive excess air out of the package before it is sealed. It is important for an attractive product that the sauce be in a smooth blended condition and ordinarily this requires that it be at a temperature in the range of 80° F. to 160° F. Although it is preferred that the gravy be placed in the package at elevated temperature for the reasons given, it may be possible to produce a satisfactory sauce by the use of gelatinized starch or a form of alginate which does not require heating in order to produce a relatively smooth sauce with its ingredients in suspension. However, my preferred method is to employ a heated sauce in order to assist in driving excess air out of the package prior to sealing it.

Promptly after the commodity is placed into the container the air space at its top is flattened, either manually or otherwise, and the top margin sealed. Then, as soon as possible, the package is cooked. It is necessary that such cooking occur before bacteria have had an opportunity to multiply to a harmful degree. In ordinary circumstances this requires cooking to begin within one hour.

A preferred method of cooking the package and which is adapted for the cooking of a large number is to place them on racks 20 within a pressure cooker vessel 21, the packages being stacked with spaces therebetween in order to permit the free circulation of heating media. The pressure cooker is provided with an inlet 22 for steam or other media, having a control valve 23, and an air vent 24 with a control valve 25. Initially, during entry of the steam into the vessel 21, the air vent 24 is opened in order to permit the escape of air therefrom, thus permitting the obtaining of a uniform temperature throughout the vessel. Steam of varying temperature and pressure may be used, depending on the nature of the commodity and the size of the packages, temperatures in the range of 230° to 260° F. being generally used. Food packages such as that described may be satisfactorily cooked at 240° F. at about 10 lbs. per square inch gage.

Initially, steam is constantly admitted and air vented until the temperature within the vessel reaches approximately 240° F., requiring about 5 minutes in one installation. Then the temperature is maintained automatically by well-known control devices which admit steam as required for the maintenance of the desired temperature. Such control device may include a valve 28 in the steam line which is controlled by thermostat 29 in the vessel. After the required temperature is reached in the vessel the air vent is closed and the cooking time reckoned therefrom. For packages such as that described, cooking for 30 minutes has been successfully used. Approximately 20 minutes of such time may be required for the contents of the packages to reach 230° F.

After the completion of the cooking cycle, the steam line 22 is closed and cooling begins. Since the vapor pressure of the commodity within each package increases with a rise in temperature, it is necessary that this be compensated by external pressure, otherwise rupture or injury of the container may occur. Ordinarily the pressure within the vessel during cooking is adequate to compensate for the pressure within the package. However, during cooling, and usually during the latter stages of cooking it is necessary to increase the pressure within the vessel. It has been found that shortly before shutting off the steam at the end of the cooking cycle, additional pressure, as by compressed air, should be provided. This may be introduced into the vessel by means of conduit 32 having a control valve 33 and automatic control valve 34 connected to pressure responsive member 35 within the vessel. The air is introduced until the pressure within the vessel rises about 2 to 5 lbs. above that existing with the steam and such pressure level is maintained after the steam is cut off until the produce has cooled to below about 200° F.

As an example of the foregoing, the sealed container is heated to a temperature of approximately 230° to 260° for approximately 30 minutes while maintaining an external pressure of approximately 10 pounds per square inch gauge on the container and during cooling the pressure is increased to approximately 12 pounds to 15 pounds per square inch gauge.

After the completion of the cooking the packages may be rapidly cooled by various means such as a water spray from pipes 37 within the vessel, such cooling time ordinarily requiring about 15 to 30 minutes, depending on the size, type and flatness of the packages. After the packages are removed from the vessel, they may be further rapidly cooled by refrigeration such as the application of water at lower temperatures.

The packages are tough, flexible and relatively flat and may be handled, transported and stored for an indefinite length of time as in the case of conventional canned goods.

As a precaution, after cooling the packages may be stored for observation at normal or higher temperatures for a period of about 10 days in order to observe whether there is any puffing due to bacterial growth.

The tops of the package preferably have identations 36 along the margins in order that a strip 38 may be easily removed for opening the package. The contents may be consumed directly from the package with or without heating or the package may be warmed prior thereto to increase palatability.

The package is especially useful for institutions, in vending machines, for hotels, restaurants, hospitals, campers, and travelers, and by the Armed Forces.

Due to the fact that the package is relatively thin, its contents may be rapidly heated to improve the palatability for consumption. As a result of its light weight and flexibility, it requires less volume for shipping and inventory than canned products. Furthermore, since it is relatively soft and flexible, it may be easily packed in personal belongings or carried on the person in a handbag or pocket. It may be easily warmed to body temperature by being carried in an inside pocket of a garment or next to the body for a brief time before consumption and may be easily opened and the contents consumed directly from the package under adverse conditions such as in vehicles or under cover of darkness, and without requiring any instrument for opening or eating. The used package takes up a minimum of space when empty and may be easily concealed, thus minimizing the refuse disposal problem.

Accordingly, it will be understood that the present invention includes a light weight, relatively flexible, package including a container for protecting the commodity against rays, moisture and foreign substances, and which is sufficiently tough for ordinary handling, and which contains a cooked, preserved commodity such as relatively fat-free pieces of meat of normal texture and flavor in an appropriate palatable sauce whereby the meat and the sauce may be stored indefinitely or made available for consumption by easily opening the package without any instrument. Teh invention also includes the method of producing such package inexpensively and suitable for quantity production and which preserves the commodity for a long period of time without the necessity for refrigeration.

It will be obvious by those skilled in the art that various changes may be made in the described illustration of the invention without departing from its spirit and scope and, therefore, the invention is not limited by that which is illustrated in the drawing and described in the specification, but only as indicated in the accompanying claim.

What is claimed is:

The method of producing a relatively flat sealed cooked package of meat and sauce in a natural, ready-to-eat form which will keep indefinitely without refrigeration, consisting of providing a flat open end flexible container having a foil base to protect against rays and an inner lining laminated thereto which is inert to the meat and sauce, placing pieces of raw relatively fat-free meat having natural juices therein and a thick blended sauce mixture within the container in an amount small enough to permit the container to remain relatively flat when sealed, removing excess air from the container and sealing its open end, heating the sealed container at a temperature of approximately 230° to 260° F. for a period of time sufficient to cook the meat and sauce and sterilize the contents of the container while maintaining an external pressure on the container adequate to prevent rupture from internal forces, the natural juices from the meat combining with and thinning the sauce during such heating, and cooling the package while maintaining sufficient external pressure thereon to prevent damage to the container from internal pressure.

References Cited in the file of this patent

UNITED STATES PATENTS

| | | |
|---|---|---|
| 1,058,682 | Atkinson | Apr. 8, 1913 |
| 2,231,791 | Bensel | Feb. 11, 1941 |
| 2,369,765 | Waters | Feb. 20, 1945 |
| 2,380,134 | Waters | July 10, 1945 |
| 2,398,082 | Cavallito | Apr. 4, 1946 |
| 2,633,284 | Moffett et al. | Mar. 31, 1953 |
| 2,807,550 | Zarotschenzeff et al. | Sept. 24, 1957 |
| 2,881,078 | Oritt | Apr. 7, 1959 |
| 3,037,869 | Esson et al. | June 5, 1962 |

OTHER REFERENCES

"Refrigerating Engineering," February 1954, pages 45 to 48, inclusive, article entitled Protective Packaging of Frozen Foods, by Woodruff and Rabak.